United States Patent [19]

Hiraga et al.

[11] Patent Number: 4,474,543
[45] Date of Patent: Oct. 2, 1984

[54] ROTATION PREVENTION DEVICE FOR AN ORBITING MEMBER OF A FLUID DISPLACEMENT APPARATUS

[75] Inventors: Masaharu Hiraga, Honko; Takayuki Iimori, Isesaki; Seiichi Sakamoto, Gunma, all of Japan

[73] Assignee: Sanden Corporation, Gunma, Japan

[21] Appl. No.: 361,108

[22] Filed: Mar. 23, 1982

[30] Foreign Application Priority Data

Mar. 23, 1981 [JP] Japan .................................. 56-40405

[51] Int. Cl.$^3$ .......................... F01C 1/02; F01C 21/02; F16D 3/04
[52] U.S. Cl. ........................................ 418/55; 464/103
[58] Field of Search ................ 418/55, 57, 59; 464/81, 464/103, 139

[56] References Cited

U.S. PATENT DOCUMENTS 4,160,629 7/1979 Hidden et al. ........................ 418/55
4,259,043 3/1981 Hidden et al. ........................ 418/55

FOREIGN PATENT DOCUMENTS 928465 6/1947 France .
976187 10/1950 France .

Primary Examiner—John J. Vrablik
Attorney, Agent, or Firm—Banner, Birch, McKie & Beckett

[57] ABSTRACT

A rotation preventing/thrust bearing device for an orbiting member of a fluid displacement apparatus is disclosed. The rotation preventing/thrust bearing device includes a discrete fixed portion, a discrete orbital portion and bearing elements. The fixed and orbital portions each include an annular race and a ring which covers the end surface of the race. Both rings have a plurality of holes or pockets in an axial direction. The radius of the fixed pockets is greater than the radius of the orbital pockets. The bearing elements, one of which is placed between each opposing pair of pockets, roll at radius R1 with regard to the fixed race and roll at radius R2 with regard to the orbital race. The sum of rolling radii R1 and R2 is substantially equal to the radius of the orbiting member. Rotation of the orbiting member is thereby prevented by the bearing elements which interact with the edges of the opposing pairs of pockets and the bearing elements carry axial thrust load from the orbiting member to the fixed race. By setting radius R2 smaller than radius R1, while maintaining the sum of these radii substantially equal to the orbit radius, the size and weight of the orbital race and the orbital ring can be reduced, which in turn reduces the overall weight of the orbital member of the fluid displacement apparatus. A reduction in the weight of the orbital member simplifies the construction of the apparatus by reducing the size of balance weights.

4 Claims, 8 Drawing Figures

ROTATION PREVENTION DEVICE FOR AN ORBITING MEMBER OF A FLUID DISPLACEMENT APPARATUS

BACKGROUND OF THE INVENTION

This invention relates to a fluid displacement apparatus, and more particularly, to an improvement in a rotation preventing/thrust bearing device for an orbiting member of a fluid displacement apparatus.

There are several types of fluid displacement apparatus which utilize an orbiting member, such as a piston or a scroll, driven by a Scotch yoke type shaft coupled to an end surface of the orbiting member. One such apparatus, disclosed in U.S. Pat. No. 1,906,142 issued to John Ekelof, is a rotary machine which has an annular and eccentrically movable piston adapted to act within an annular cylinder. The annular cylinder has a radial transverse wall, one end of which is fixedly mounted. Another wall forms a cover disc which is connected to the annular piston; the annular piston is driven by a crank shaft. Other prior art apparatus of this type, which consists of scroll type fluid displacement apparatus, is shown in U.S. Pat. Nos. 801,182 and 3,500,119. Though the present invention applies to either an annular orbiting piston or an orbiting scroll, the description will be limited to a scroll type compressor.

The above mentioned U.S. Pat. No. 801,182 (Creux) discloses a device including two scrolls each having a circular end plate and a spiroidal or involute spiral element. These scrolls are maintained angularly and radially offset so that both spiral elements interfit to make a plurality of line contacts between their spiral curved surfaces to thereby seal off and define at least one pair of fluid pockets. The relative orbital motion of the two scrolls shifts the line contacts along the spiral curved surfaces and, as a result, the volume of the fluid pockets changes. Since the volume of the fluid pockets increases or decreases dependent on the direction of the orbital motion, the scroll type fluid displacement apparatus is applicable to compress, expand or pump fluids.

Generally, in conventional scroll type fluid displacement apparatus, one scroll is fixed to a housing and the other scroll, which is the orbiting scroll, is eccentrically supported on a crank pin of a rotating shaft to cause orbital motion. The scroll type apparatus also includes a rotation preventing device which prevents rotation of the orbiting scroll to thereby maintain the scroll in a predetermined angular relationship during operation of the apparatus.

Because the orbiting scroll in conventional scroll type apparatus is supported on a crank pin in a cantilever manner, an axial slant of this orbiting scroll occurs. Axial slant also occurs because the movement of the orbiting scroll is not rotary motion around the center of the orbiting scroll, but is orbiting motion caused by the eccentric movement of a crank pin driven by the rotation of the drive shaft. Several problems result from the occurrence of this axial slant including improper sealing of line contacts, vibration of the apparatus during operation and noise caused by physical striking of the spiral elements. One simple and direct solution to these problems is the use of a thrust bearing device for carrying the axial loads. Thus, a scroll type fluid displacement apparatus is usually provided with a thrust bearing device within the housing.

One recent attempt to improve the rotation preventing and thrust bearing devices in scroll type fluid displacement apparatus is described in U.S. Pat. Nos. 4,160,629 (Hidden et al) and 4,259,043 (Hidden et al). The rotation preventing and thrust bearing functions in these U.S. patents are integral with one another. A rotation preventing/thrust bearing device according to these patents comprises one set of indentations formed on the end surface of the circular plate of the orbiting scroll and a second set of indentations formed on the end surface of fixed plate attached to the housing. A plurality of balls or spheres are placed between the indentations of both surfaces. All the indentations have the same cross-sectional configuration and the center of all the indentations formed on both end surfaces are located on circles having the same radius. As a result, the machining and fabrication of these indentations with accurate dimensions is very difficult and intricate.

Referring to FIGS. 1 and 2, one prior art solution to overcome the above disadvantages is shown. FIG. 1 is a vertical sectional view of a part of a compressor and FIG. 2 is an exploded perspective view of a rotation preventing/thrust bearing device. Rotation preventing/thrust bearing device 37' surrounds a boss 273' of orbiting scroll 27' and includes an orbital portion, a fixed portion and bearings, such a plurality of balls. The fixed portion includes (1) an annular fixed race 371' having one end surface fitted against an axial end surface of annular projection 112' of front end plate 11', and (2) a fixed ring 372' fitted against the other axial end surface of fixed race 371' to extend outwardly therefrom and cover the other end surface of fixed race 371'. Fixed race 371' and ring 372' are attached to the axial end surface of annular projection 112' by pins 373'. The orbital portion also includes (1) an annular orbital race 374', which has one end surface fitted against an axial end surface of circular plate 271' and (2) an orbital ring 375' fitted against the other axial end surface of orbital race 374' to extend outwardly therefrom and cover the other axial end surface of orbital race 374'. A small clearance is maintained between the end surface of fixed ring 372' and the end surface of orbital ring 375'. Orbital race 374' and ring 375' are attached to the end surface of circular plate 271' by pins 376'.

Fixed ring 372' and orbital ring 375' each have a plurality of holes or pockets 372a' and 375a' in the axial direction, the number of holes or pockets in each ring 372' and 375' being equal. The holes or pockets 372a' on fixed ring 372' correspond to or are a mirror image of the holes or pockets 375a' on orbital ring 375', i.e., each pair of pockets facing each other have the same size and pitch, and the radial distance of the pockets from the center of their respective rings 372' and 375' is the same, i.e., the centers of the pockets are located at the same distance from the center of the rings 372' and 375'. Thus, if the centers of the rings 372' and 375' were aligned, which they are not in actual operation of the rotation preventing/thrust bearing device 37', the holes or pockets 372a' and 375a' would be identical or in alignment. Bearing elements, such as balls or spheres 377' are placed between facing or generally aligned pairs of pockets 372a' and 375a' of fixed and orbital rings 372' and 375'.

In this arrangement, the radii of pockets 372a' and 375a' are equal to half the orbital radius Ro. Also, during operation of the compressor, balls 377' are held within the pockets by the edges of opposing pairs pockets, i.e., balls 377' move along the edges of opposing pairs pockets. Thus, when orbiting scroll orbits at radius Ro, the traveling radius of balls 377' against the race is half the traveling radius of the orbiting scroll during orbital motion. Since the width of the race must be greater than the traveling radius of balls, the size of the race is determined by the traveling radius of the balls. The race on the orbiting scroll contributes to the total weight of the orbital part, which includes the orbiting scroll, the orbital portion of the rotation preventing/thrust bearing device, and part of the driving mechanism. Therefore, it is desirable to reduce the size of the race on the orbiting scroll in order to reduce the total weight of the orbital part of the prior art compressors.

SUMMARY OF THE INVENTION

It is a primary object of this invention to provide an improved rotation preventing/thrust bearing device for an orbiting member of a fluid displacement apparatus.

It is another object of this invention to provide a rotation preventing/thrust bearing device for an orbiting member of a fluid displacement apparatus which is light in weight and simple in construction.

It is still another object of this invention to provide an orbiting member for a fluid displacement apparatus which maintains dynamic balance.

A fluid displacement apparatus according to this invention includes a housing. A fixed member is attached to the housing and has a first end plate from which a fixed fluid displacement member extends into the interior of the housing. An orbiting member has a second end plate from which an orbiting fluid displacement member extends. The fixed and orbiting fluid displacement members interfit at a radial offset to make line contacts which separate a fluid inlet from a fluid outlet. A driving mechanism, including a drive shaft rotatably supported by the housing, is connected to the orbiting member to effect the orbital motion of the orbiting fluid displacement member. A rotation preventing/thrust bearing device is connected to the orbiting fluid displacement member for preventing the rotation of the orbiting fluid displacement member during orbital motion so that the line contacts move toward the discharge side during orbital motion.

The rotation preventing/thrust bearing device comprises an orbital portion, a fixed portion and a plurality of bearings, such as balls or spheres. The orbital portion includes a first annular race and ring, both of which are formed separately. The first race is placed within an annular groove formed on an axial end surface of the end plate of the orbiting member. The first ring is fitted against the axial end surface of the end plate of the orbiting member to cover the end surface of the first race. The fixed portion includes a second annular race and a second ring, both of which are formed separately. The second race is placed within an annular groove formed on an axial end surface of the housing and the second ring covers the axial end surface of the second race. A clearance is maintained between the first ring of the orbital portion and the second ring of the fixed portion.

The orbital and fixed (first and second) rings each have a plurality of holes or pockets in the axial direction, the number of holes or pockets in each ring being equal. The radii of the pockets of the fixed ring are greater than the radii of the pockets of the orbital ring. The bearings are placed between each pair of facing pockets. Each bearing is permitted to roll with regard to the orbital race at radius R1 and also is permitted to roll with regard to the fixed race at radius R2. The total or sum of both radii is substantially the same as the orbital radius of the orbiting member. The bearings roll along the edges of both facing pockets. As a result, the rotation of the orbiting member is prevented by the bearings and the thrust load from the orbiting member is supported by the fixed race through the bearings.

Further objects, features and other aspects of this invention will be understood from the following detailed description of the preferred embodiment of this invention referring to the annexed drawings.

DETAILED DESCRIPTION OF THE PREFERRED EMBODIMENT

Figure 1:
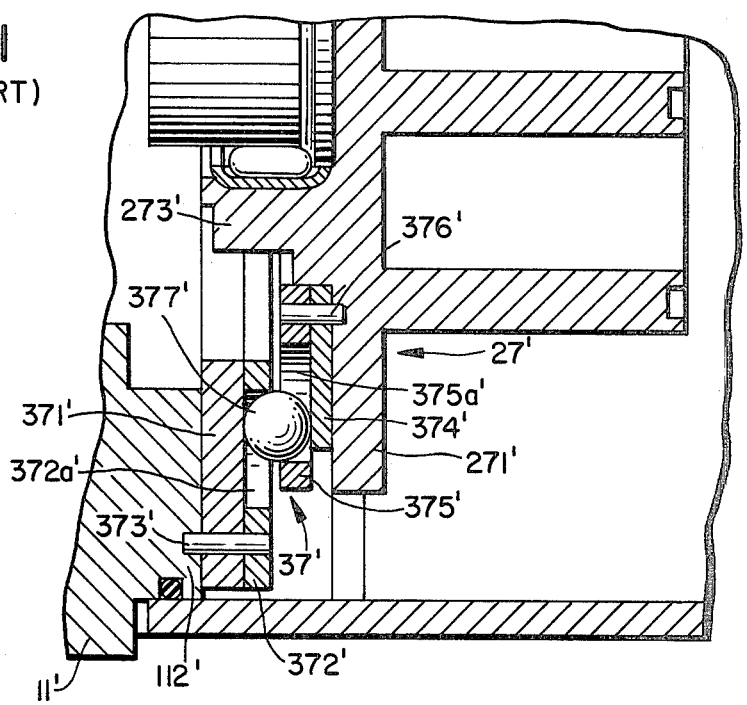
FIG. 1 is a vertical sectional view of a part of a compressor illustrating a prior art construction of the rotation preventing/thrust bearing device.
Figure 5:
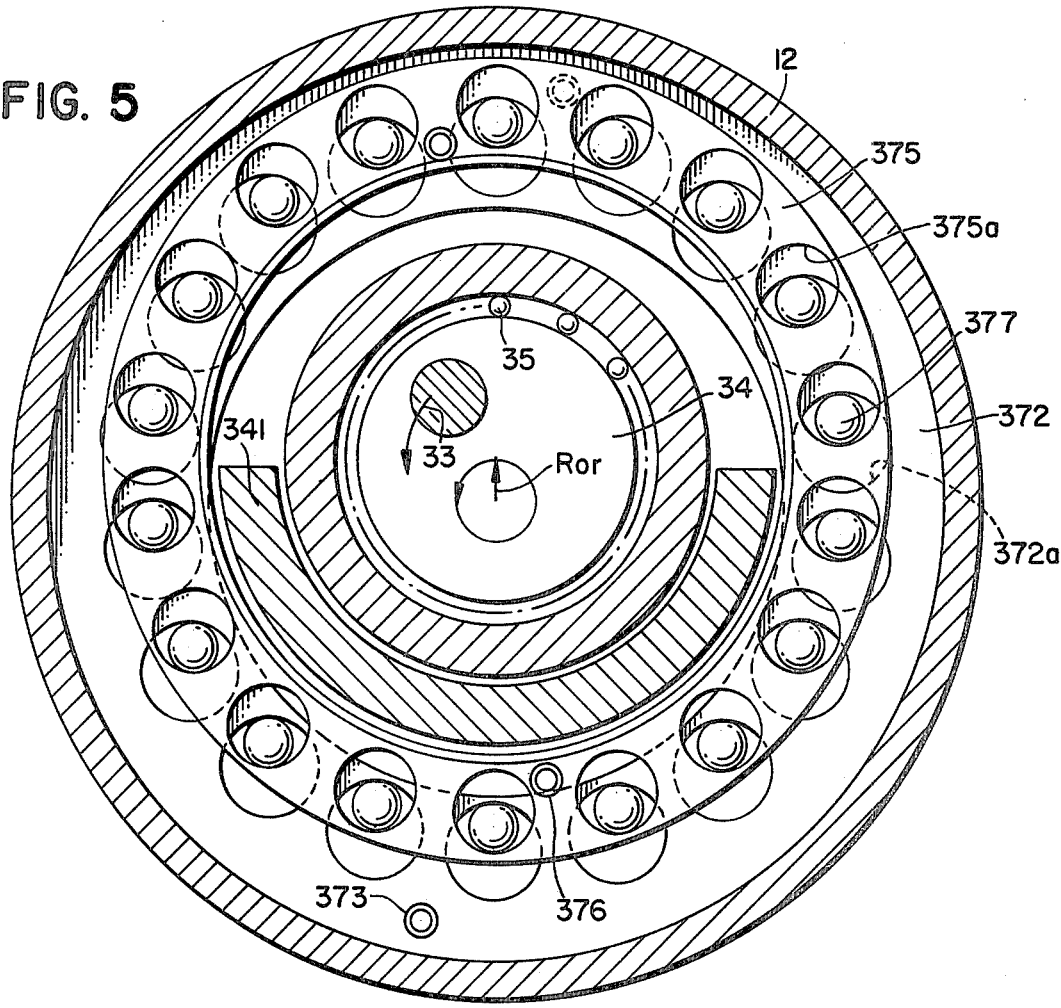
FIG. 5 is a sectional view take along the line 5—5 in FIG. 3.
Figure 2:
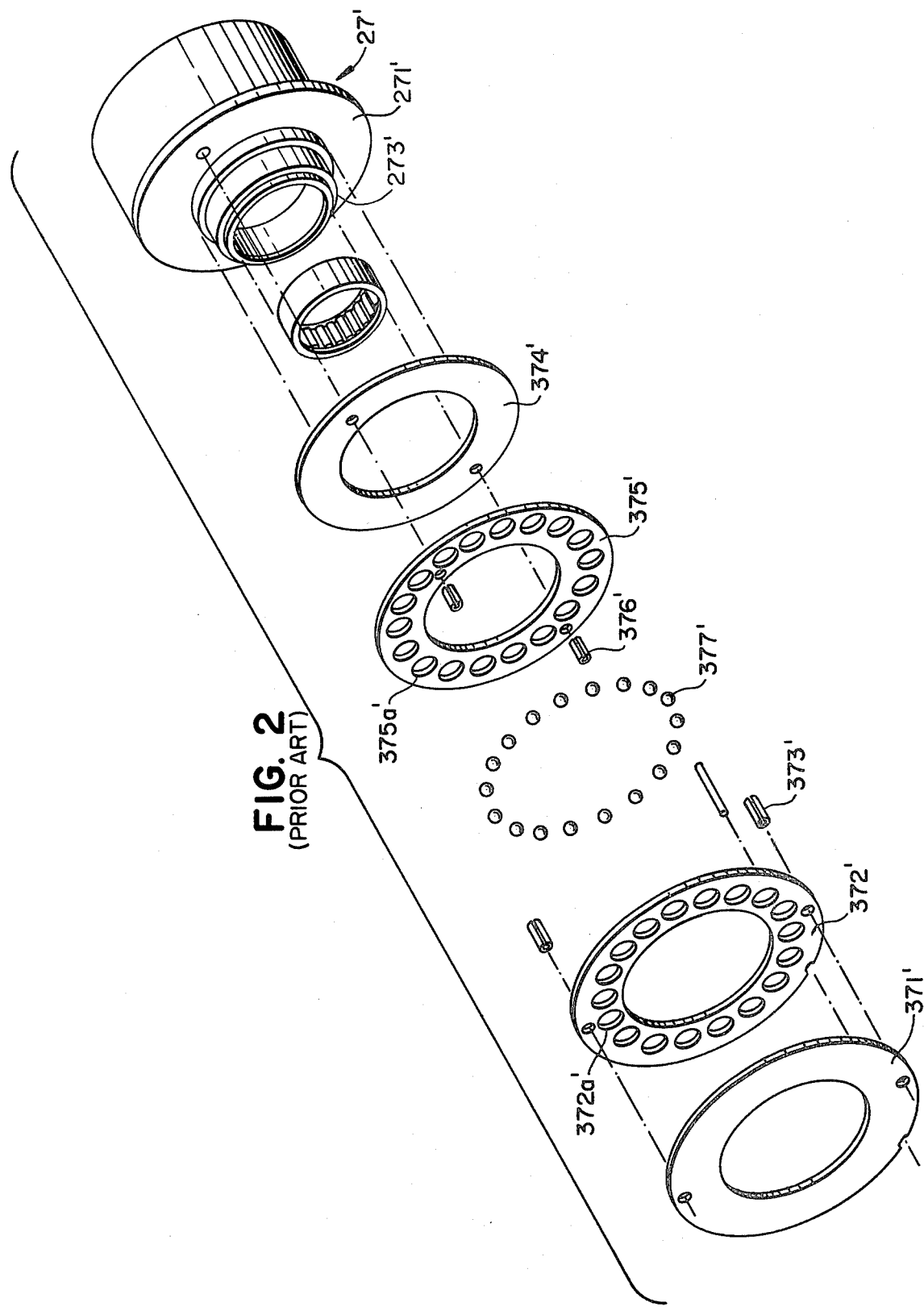
FIG. 2 is an exploded perspective view of the rotation preventing/thrust bearing device shown in FIG. 1.
Figure 3:
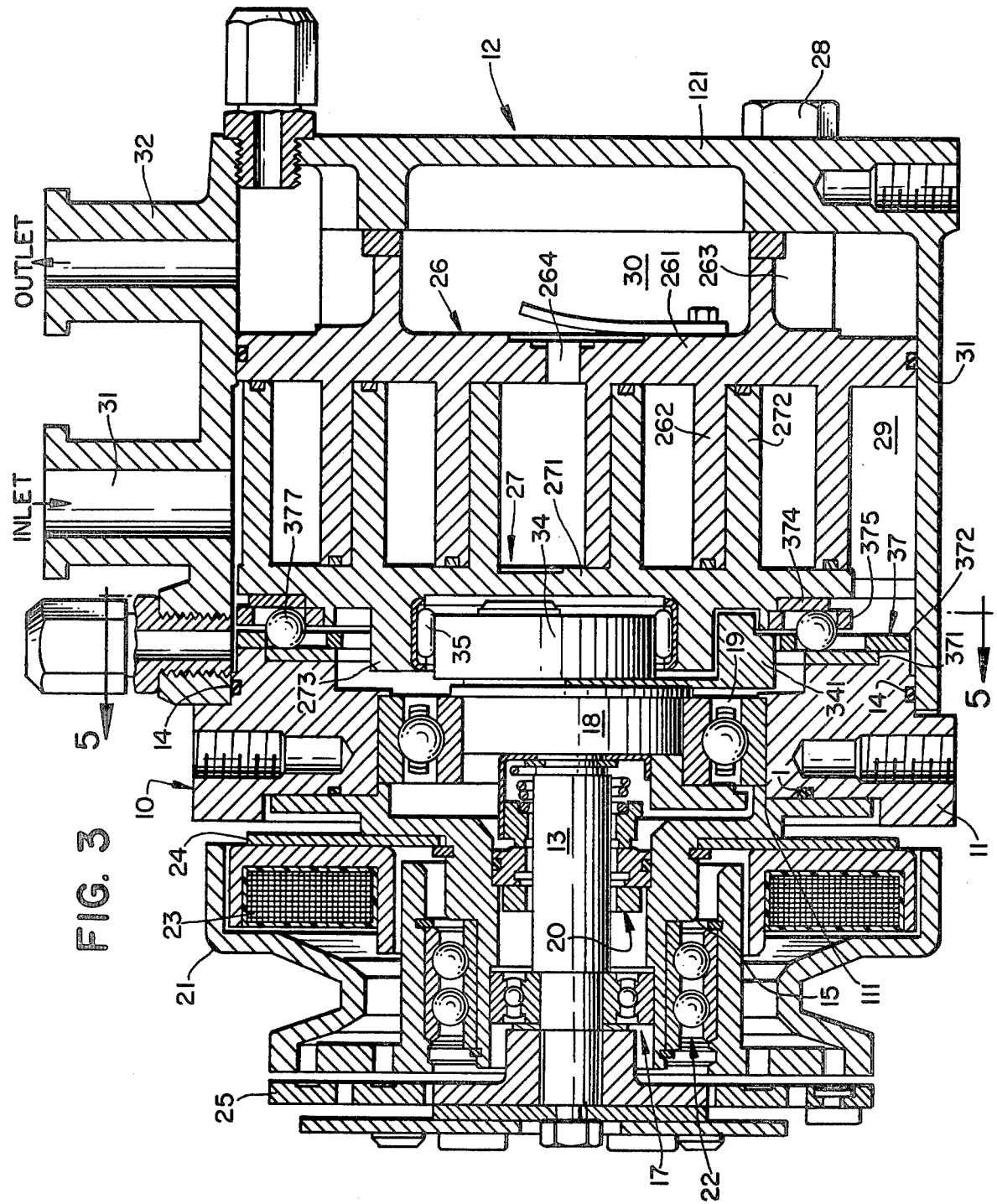
FIG. 3 is a vertical sectional view of a compressor unit according to one embodiment of this invention.

Referring to FIG. 3, a fluid displacement apparatus in accordance with the present invention is shown in the form of scroll type refrigerant compressor unit 1. Compressor unit 1 includes compressor housing 10 having front end plate 11 and cup shaped casing 12 which is attached to an end surface of front end plate 11. An opening 111 is formed in the center of front end plate 11 for the penetration or passage of drive shaft 13. An annular projection 112 is formed in the rear end surface of front end plate 11 which faces cup shaped casing 12; this annular projection 112 is concentric with opening 111. An outer peripheral surface of annular projection 112 bites into an inner wall of the opening of cup shaped casing 12. Cup shaped casing 12 is fixed on the rear end surface of front end plate 11 by a fastening device, for example, bolts and nuts, so that the opening of cup shaped casing 12 is covered by front end plate 11. An O-ring 14 is placed between the outer peripheral surface of annular projection 112 and the inner wall of the opening of cup shaped casing 12 to seal the mating surface of front end plate 11 and cup shaped casing 12. Front end plate 11 has an annular sleeve 15 projecting from the front end surface thereof which surrounds drive shaft 13 and defines a shaft seal cavity. In the embodiment shown in FIG. 3, sleeve 15 is separated from front end plate 11; sleeve 15 is fixed to the front end surface of front end plate 11 by screws (not shown). An O-ring 16 is placed between the end surface of front end plate 11 and an end surface of sleeve 15 to seal the surface of front end plate 11 and sleeve 15. Alternatively, sleeve 15 may be integral with front end plate 11.

Drive shaft 13 is rotatably supported by sleeve 15 through bearing 17 located near the front end of sleeve 15. Drive shaft 13 has disk 18 at its inner end which is rotatably supported by front end plate 11 through bearing 19 located within opening 111 of front end plate 11.

A shaft seal assembly 20 is coupled to drive shaft 13 within the shaft seal cavity of sleeve 15.

A pulley 21 is rotatably supported by bearing 22 which is located on an outer surface of sleeve 15. An electromagnetic coil 23, which surrounds sleeve 15, is supported by support plate 24 in an annular cavity of pulley 21. An armature plate 25 is elastically supported on the outer end of drive shaft 13 which extends from sleeve 15. A magnetic clutch includes pulley 21, magnetic coil 23, and armature plate 25. In operation, drive shaft 13 is driven by an external drive power source, for example, a vehicle engine, through a rotation force transmitting device such as the above described magnetic clutch.

A fixed scroll 26, an orbiting scroll 27, a driving mechanism for orbiting scroll 27 and a rotation preventing/thrust bearing device for orbiting scroll 27 are located within an inner chamber of cup shaped casing 12. The inner chamber is formed between the inner wall of cup shaped casing 12 and front end plate 11.

Fixed scroll 26 includes circular end plate 261, a wrap or spiral element 262 affixed to or extending from one side surface of circular end plate 261 and a plurality of internally threaded bosses 263 axially projecting from the other end surface of circular plate 261. An axial end surface of each boss 263 is seated on the inner surface of an end plate 121 of cup shaped casing 12 and fixed by bolts 28. Hence, fixed scroll 26 is fixed within cup shaped casing 12. Circular plate 261 of fixed scroll 26 divides the inner chamber of cup shaped casing 12 into a discharge chamber 30 and a suction chamber 29. A seal ring 31 is located between the outer peripheral surface of circular plate 261 and the inner wall of cup shaped casing 12. A hole or discharge port 264 is formed through circular plate 261 at a position near the center of spiral element 262; discharge port 264 is connected between the central fluid pockets of the spiral element 262 and discharge chamber 30.

Orbiting scroll 27 also includes a circular end plate 271 and a wrap or spiral element 272 affixed to or extending from one side surface of circular end plate 271. Spiral element 272 and spiral element 262 of fixed scroll 26 interfit at an angular offset of 180° and a predetermined radial offset. At least a pair of fluid pockets are thereby defined between both spiral elements 262,272. Orbiting scroll 27, which is connected to the drive mechanism and to the rotation preventing/thrust bearing device, is driven in an orbital motion at a circular radius Ro by rotation of drive shaft 13 to thereby compress fluid passing through the compressor unit. Generally, radius Ro of orbital motion is given by the following formula:

$$Ro = \frac{(\text{pitch of spiral element}) - 2(\text{wall thickness of spiral element})}{2}$$

Figure 7:
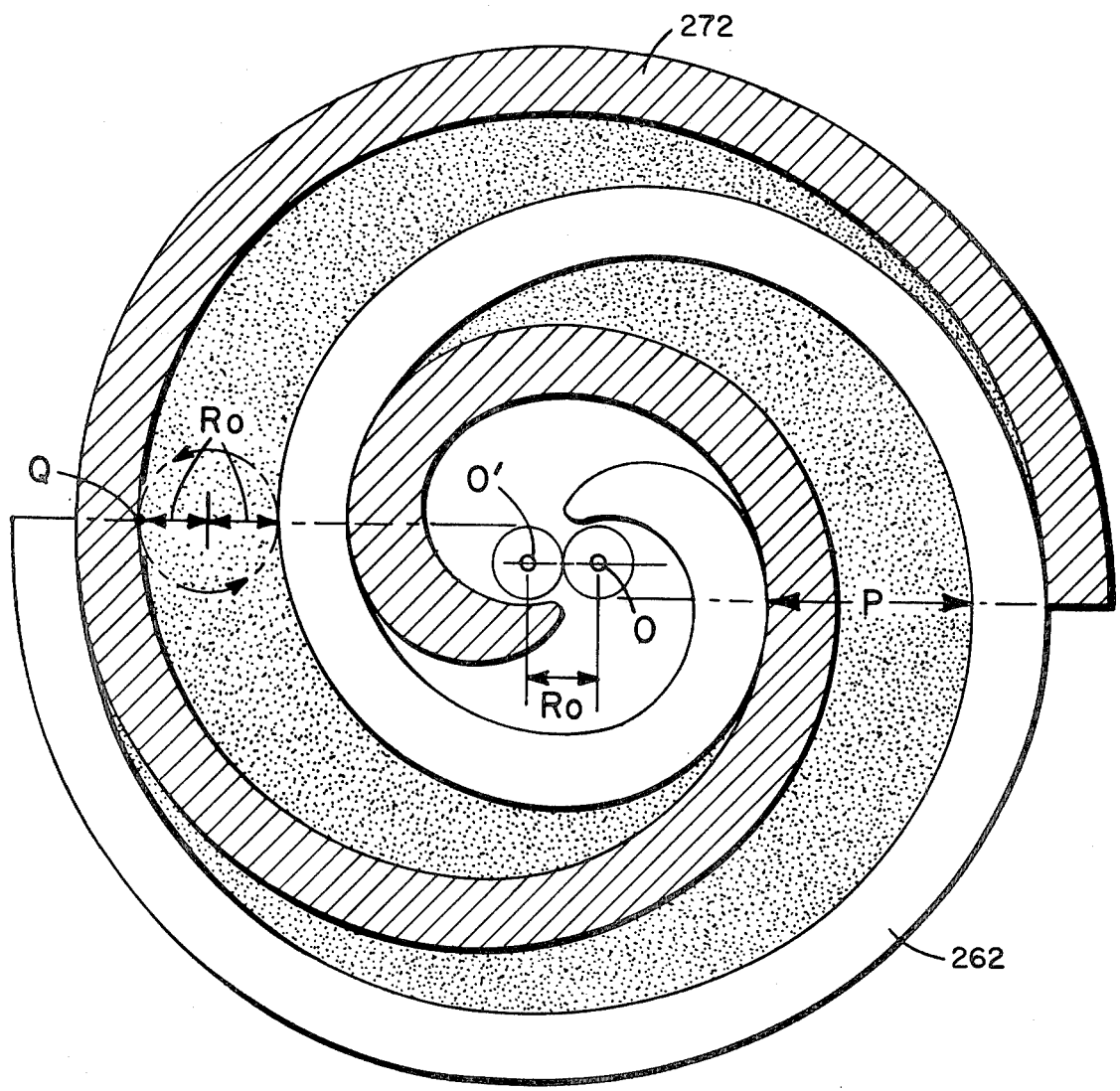
FIG. 7 is a diagrammatic sectional view illustrating the spiral elements of the fixed and orbiting members.

As shown in FIG. 7, the pitch (P) of the spiral elements can be defined by 2rg, where rg is the involute generating circule radius. The radius of orbital motion Ro is also illustrated in FIG. 7 as the locus of an arbitrary point Q on orbiting scroll 27. The spiral element 272 is radially offset from spiral element 262 of fixed scroll member 26 by the distance Ro. Thus, orbiting scroll 27 undergoes orbital motion of a radius Ro upon rotation of drive shaft 13. As the orbiting scroll 27 orbits, the line contacts between spiral elements 262,272 move toward the center of the spiral elements along the surface of the spiral elements. The fluid pockets, which are defined by spiral elements 262,272, also move to the center with a consequent reduction in volume and compression of the fluid in the fluid pockets. The fluid or refrigerant gas, which is introduced into suction chamber 29 from an external fluid circuit through inlet port 33, is drawn into the fluid pockets formed between spiral elements 262,272 from the outer ends of the spiral elements. As orbiting scroll 27 orbits, fluid in the fluid pockets is compressed and compressed fluid is discharged into discharge chamber 30 from the centeral fluid pocket of the spiral elements through hole 264. The fluid then is discharged to the external fluid circuit through an outlet port 32.

Figure 4:
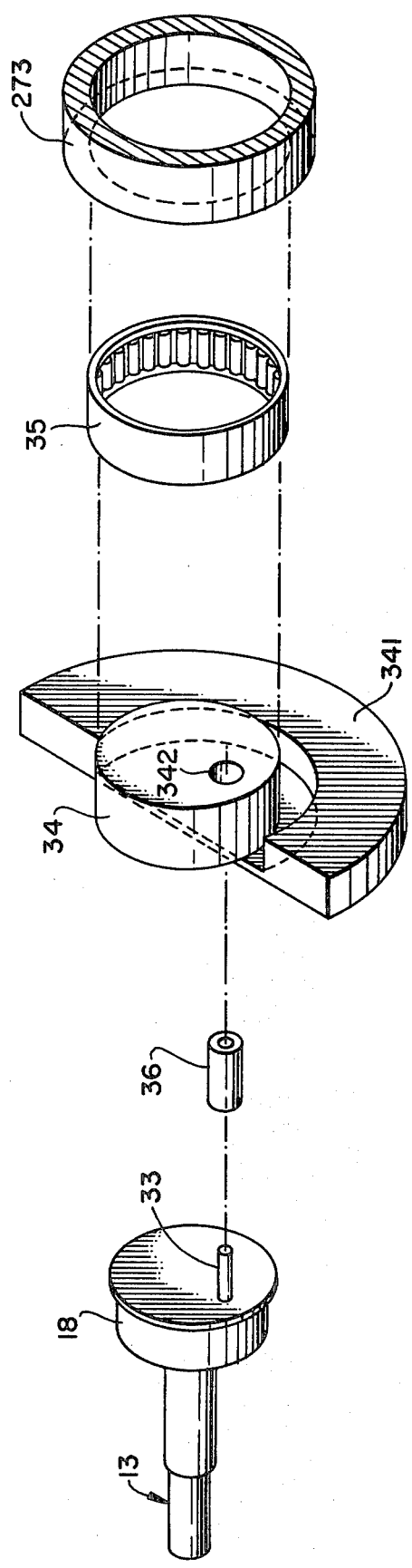
FIG. 4 is an exploded perspective view of the driving mechanism in the embodiment of FIG. 3.
Figure 6:
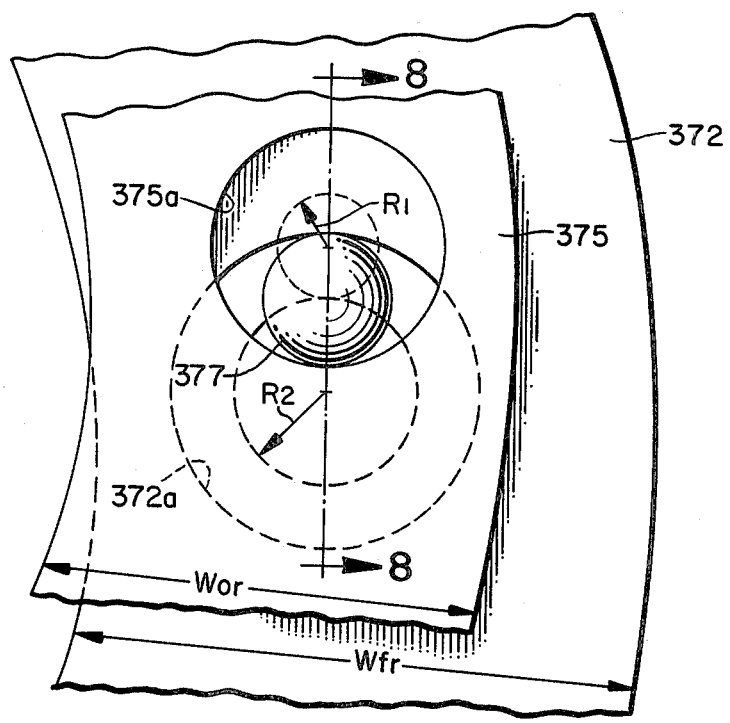
FIG. 6 is a sectional view of a part of the rotation preventing/thrust bearing device in FIG. 5.
Figure 8:
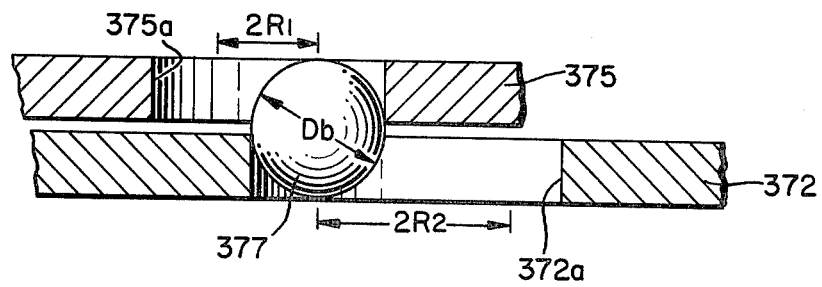
FIG. 8 is a cross-sectional view along line 8—8 of FIG. 6.

Referring again to FIGS. 3 and 4, the driving mechanism of orbiting scroll 26 will now be described in greater detail. Drive shaft 13, which is rotatably supported by sleeve 15 through bearing 17, is connected to disk 18. Disk 18 is rotatably supported by front end plate 11 through bearing 19 disposed within opening 111 of front end plate 11. A crank pin or drive pin 33 axially projects from an axial end surface of disk 18 at a position which is radially offset from the center of drive shaft 13. Circular plate 271 of orbiting scroll 27 has a tubular boss 273 axially projecting from the end surface opposite the surface from which spiral element 272 extends. A discoid or short axial bushing 34 fits into boss 273 and is rotatably supported therein by a bearing, such as a needle bearing 35. Bushing 34 has a balance weight 341 which has the shape of a semi-disk or ring radially connected to bushing 34 along a front surface thereof. An eccentric hole 342 is formed in bushing 34 at a position radially offset from the center of bushing 34. Drive pin 33 fits into eccentric hole 342 together with bearing 36. Bushing 34, which is driven by the revolution of drive pin 33, rotates within a bearing 35.

Now, the rotation of orbiting scroll 27 is prevented by a rotation preventing/thrust bearing device 37 which is positioned between the inner wall of the housing 10 and circular plate 271 of orbiting scroll 27 and around boss 273 of orbiting scroll 27. As a result, orbiting scroll 27 orbits while maintaining its angular orientation relative to fixed scroll 26.

Referring to FIGS. 3, 5, 6 and 8, rotation preventing/thrust bearing device 37 will be described in greater detail. Rotation preventing/thrust bearing device 37 includes a fixed portion, an orbital portion and bearings, such as a plurality of balls or spheres. Fixed portion includes (1) an annular race 371 and (2) fixed ring 372 formed separately from fixed race 371. Annular fixed race 371 is placed within an annular groove formed on the axial end surface of annular projection 112 of front end plate 11. Fixed ring 372 is fitted against the axial end surface of annular projection 11 and fixed on its surface by pins 373, and has a width to cover the end surface of fixed race 371. The orbital portion also includes (1) an annular orbital race 374 and (2) an orbital ring 375 formed separately from the orbital race. Orbital race 374 is placed within an annular groove formed on the end surface of circular plate 272 of orbiting scroll 27. Orbital ring 375 is fitted against the end surface of circular plate 271 and fixed on the axial end surface of circular plate 271 by pins 376, and has width to cover the end surface of orbital race 374. The fixed and orbital races 371 and 374 are fixed on the annular grooves by fitting or caulking.

Fixed ring 372 and orbital ring 375 each have a plurality of holes or pockets 372a and 375a in the axial direction, the number of holes or pockets in each ring 372 and 375 being equal. Fixed ring 372 and orbital ring 375 face each other at a predetermined axial clearance. The radius of each pocket 372a of fixed ring 372 is formed greater than the radius of each pocket 375a of orbital ring 375. Pockets 372a of fixed ring 372 correspond in location to pockets 375a of orbital ring 375, i.e., at least each pair of pockets facing each other have the same pitch, and the radial distance of pockets from the center of their respective rings 372 and 375 is the same. The centers of each pair of pockets 372a and 375a are radially offset by an amount equal to the distance Ro. Bearings, such as a plurality of balls, are placed between the edges of pockets 372a of fixed ring 372 and the edges of pockets 375a of orbital ring 375.

During the operation of the fluid displacement apparatus, each ball 377 is in contact with the axial end surface of orbital race 374 and rolls along the edge of pocket 375a. Balls 377 also contact the axial end surface of fixed race 371 and roll along the edges of the pockets 372a of fixed ring 372. As a result, the locus of the contact point of each ball 377 on orbital race 374 is a circle having a radius R1, i.e., the traveling radius of each ball 377 with regard to the axial end surface of orbital race 374 is defined by R1, and the locus of the contact point of each ball 377 on fixed race 371 is a circle having a radius R2, i.e., traveling radius of ball 377 with regard to the axial end surface of fixed race 371 is defined by R2.

The rotation of orbiting scroll 27 is prevented by balls 377, each of which is placed between the edges of facing pockets 372a and 375a during operation, while the angular relationship between fixed scroll 26 and orbiting scroll 27 is maintained. Moreover, the axial load from orbiting scroll 27, which is caused by the reaction force of the compressed gas, is carried by fixed race 371, orbital race 374 and balls 377.

In this arrangement, the total or sum of the traveling radii R1 and R2 of each ball 377 with regard to the fixed and orbital races 371 and 374 must be set equal to the orbital radius Ro, i.e., $R1 + R2 = Ro$, where Ro is the orbital radius of orbiting scroll 27. As a result, the orbiting scroll 27 is able to move in an orbital motion at radius Ro. As long as the total or sum of the traveling radii R1 and R2 of each ball with regard to the fixed and orbital races 371 and 374 equals the orbital radius Ro, the radii of facing pockets 372a and 375a can be different so that these pockets need not align precisely with each other.

If the width of orbiting ring 375, fixed ring 372 and the diameter of ball 377 are given, the maximum traveling radius R1 of each ball 377 within pockets 375a of orbital ring 375 is defined by R1

$$\frac{Wor - Db}{2},$$

where Wor is the width of orbital ring 375 and Db is the diameter of ball 377. Then, the maximum traveling radius R2 of each ball 377 within pockets 372a of fixed ring 372 is defined by R2

$$\frac{Wfr - Db}{2},$$

where Wfr is the width of fixed ring 372. The diameter of each pocket is defined by 2R1+Db or 2R2+Db. If each traveling radius R1 or R2 is established above the value defined above, the hole cannot form in the ring.

Furthermore, the difference between the radii R1 and R2 should be one tenth the ball diameter or less for suitable operation, because if the difference between the radii is too large, the traveling radii of ball 377 with regard to the fixed and orbital races 371 and 374 are too different and the balls 377 cannot make rolling contact with the surfaces of both races, which results in sliding motion.

In this arrangement, the total or sum of both traveling radii R1 and R2 of each ball need not strictly correspond to the orbital radius Ro because the traveling radius of each ball is influenced by dimensional errors of the ball and the configuration of the hole. Furthermore, if the total or sum of the traveling radii R1 and R2 of each ball is smaller than the predetermined orbital radius Ro, i.e., $R1+R2 < Ro$, the orbiting scroll cannot move. The tolerance for these radii is thus given by the following formula:

$$\frac{Wor + Wfr - 2Db}{2} > R1 + R2 \geq Ro + (\alpha 1 + \alpha 2 + \alpha 3)$$

where $\alpha 1$ is half the tolerance of the pocket diameter, $\alpha 2$ is the maximum amount of error in the center position of the pocket, and $\alpha 3$ is half the tolerance for the ball diameter. The above tolerance is acceptable because: (1) the center of reaction force on circular plate 271 of orbiting scroll 27 and the vector of this force are changed by the crank angle of the drive shaft; and (2) ball 377 has a dimensional error.

The above relationships may be used to determine the maximum traveling radii R1 and R2 for a given width of the orbiting and fixed rings. It should be understood that in practice, traveling radii R1 and R2 must always be less than (Wor−Db)/2 and (Wfr−Db)/2, respectively. Otherwise, the radii would exceed the width of their respective rings. While the above relationships assume a given width of the orbiting and fixed rings, these relationships may also be used to determine minimum ring widths from pre-established radii R1 and R2.

In the present invention, as above described, the radii of orbital pockets 375a are smaller than the radii of fixed pockets 372a. As a result, the traveling radius of each ball with regard to orbital race 374 is smaller and the width of the orbital race 374 and ring 375 can be reduced. Therefore, the weight of the orbital portion of rotation preventing/thrust bearing device 37, which is attached to orbiting scroll 27, can be reduced. By reducing the weight of the orbiting scroll assembly, which includes the orbital portion of rotation preventing/thrust bearing device 37, the weight of balance weight 341 (see FIG. 3), which maintains the dynamic balance of the orbiting scroll assembly, can be reduced and the balance weight can be more simply constructed.

Although illustrative embodiments of the invention have been described in detail with reference to the accompanying drawings, it is to be understood that the invention is not limited to those precise embodiments and that various changes and modifications can be effected therein by one skilled in the art without departing from the scope or spirit of the invention.

We claim:

1. In a fluid displacement apparatus including a housing, a fixed member attached to said housing and having a first end plate from which a fixed fluid displacement member extends into the interior of said housing, an orbiting member having a second end plate from which an orbiting fluid displacement member extends, said fixed and orbiting fluid displacement members interfitting at a radial offset to make a line contact to separate a fluid inlet from a fluid outlet and a driving mechanism connected to said orbiting member to drive said orbiting member in an orbital motion at a predetermined orbital radius, rotation preventing/thrust bearing means connected to said orbiting member for preventing rotation of said orbiting member and for carrying axial thrust loads from said orbiting member during orbital motion, said rotation preventing/thrust bearing means comprising:

a discrete orbital portion including an orbital annular race placed within an annular groove formed on said second end plate on an opposite side from which said orbiting fluid displacement member extends and an orbital ring attached to said second end plate to cover said orbital race;

a discrete fixed portion including a fixed annular race placed within an annular groove formed on said housing and a fixed ring attached to said housing to cover said fixed race, said fixed ring facing said orbital ring at a predetermined clearance, said fixed and orbital rings each having a plurality of holes or pockets in an axial direction, the radius of the pockets of said fixed ring being greater than the radius of the pockets of said orbital ring; and bearing elements coupled between said orbital and fixed portions, each of said bearing elements being carried within an opposing pair of said pockets of said orbital and fixed rings and contacting said orbital and fixed races to roll at the radius R2 with regard to said fixed race and to roll at the radius R1 with regard to said orbital race, the sum of said radii R1 and R2 being substantially equal to the orbital radius of said orbiting member, said bearing elements preventing rotation of said orbiting member by interacting with said orbital and fixed rings and carrying the axial thrust load from said orbiting member to said fixed race.

2. In a scroll type fluid displacement apparatus including a housing, a fixed scroll attached to said housing and having a first end plate from which a first wrap extends into the interior of said housing, an orbiting scroll having a second end plate from which a second wrap extends, said first and second wraps interfitting at an angular and radial offset to make a plurality of line contacts to define at least one pair of sealed off fluid pockets, and a driving mechanism connected to said orbiting scroll to drive said orbiting scroll in an orbital motion at a predetermined orbital radius, rotation preventing/thrust bearing means connected to said orbiting scroll for preventing rotation of said orbiting scroll during orbital motion so that the volume of said fluid pockets changes, said rotation preventing/thrust bearing means comprising:

a discrete orbital portion including an orbital annular race placed within an annular groove formed on said second end plate on an opposite side from which said second wrap extends and an orbital ring attached to said second end plate to cover said orbital race;

a discrete fixed portion including a fixed annular race placed within an annular groove formed on said housing and a fixed ring attached to said housing to cover said fixed race, said fixed ring facing said orbital ring at a predetermined clearance, said fixed and orbital rings each having a plurality of holes or pockets in an axial direction, the radius of the pockets of said fixed ring being greater than the radius of the pockets of said orbital ring; and bearing elements coupled between said orbital and fixed portions each of said bearing elements being carried within an opposing pair of said pockets of said orbital and fixed rings and contacting said orbital and fixed races to roll at the radius R2 with regard to said fixed race and to roll at the radius R1 with regard to said orbital race, the sum of said radii R1 and R2 being substantially equal to the orbital radius of said orbiting scroll, said bearing elements preventing the rotation of said orbiting scroll by interacting with said orbital and fixed rings and carrying the axial thrust load from said orbiting scroll carried to said fixed race.

3. The scroll type fluid displacement apparatus claimed in claim 2 wherein the sum of R1 and R2 equals the orbital radius of said orbiting scroll.

4. The scroll type fluid displacement apparatus claimed in claim 2 wherein the sum R1 and R2 is defined by the expression $$\frac{Wor + Wfr - 2Db}{2} > R1 + R2 \geqq Ro + (\alpha 1 + \alpha 2 + \alpha 3),$$

where Wor is the width of said orbital ring, Wfr is the width of said fixed ring, Db is the diameter of said bearing elements, $\alpha 1$ is half the tolerance of the pocket diameter, $\alpha 2$ is the maximum amount of error in the center positions of the pockets and $\alpha 3$ is half the tolerance for the ball diameter.

* * * * *